United States Patent [19]
Bilger et al.

[11] Patent Number: 5,977,761
[45] Date of Patent: Nov. 2, 1999

[54] THREE-PHASE TRANSFORMER WITH IN PHASE REGULATING WINDING FOR THE REGULATION OF PHASE VOLTAGES

[75] Inventors: Helmut Bilger, Meyrin, Switzerland; Jean-François Ravot, Chevry, France

[73] Assignee: Asea Brown Boveri AG, Baden, Switzerland

[21] Appl. No.: 09/182,872

[22] Filed: Oct. 30, 1998

[30] Foreign Application Priority Data

Oct. 31, 1997 [DE] Germany .......................... 197 48 146

[51] Int. Cl.[6] .............................. H01F 30/12; H01F 30/14
[52] U.S. Cl. ............................................ 323/361; 336/5
[58] Field of Search ............................ 323/361; 336/5, 336/10, 12

[56] References Cited

U.S. PATENT DOCUMENTS

| | | | |
|---|---|---|---|
| 2,740,936 | 4/1956 | Anderson | 323/361 |
| 3,162,799 | 12/1964 | Roberts | 323/361 |
| 3,531,714 | 9/1970 | Wolfendale | 323/361 |
| 4,513,243 | 4/1985 | Novak et al. | 323/361 |
| 4,540,934 | 9/1985 | Hubel | 323/361 |
| 5,729,121 | 3/1998 | Coenders et al. | 323/361 |

FOREIGN PATENT DOCUMENTS

| | | |
|---|---|---|
| 195531 | 2/1958 | Austria . |
| 582 668 | 8/1933 | Germany . |
| 750 647 | 1/1945 | Germany . |
| 1763020 | 8/1971 | Germany . |
| 54-125434 | 9/1979 | Japan ........................ H01F 29/04 |
| 55-141717 | 11/1980 | Japan ........................ H01F 29/02 |
| 147562 | 9/1931 | Switzerland . |

OTHER PUBLICATIONS

"575–MVA–Quereinstell–Transformatorensatze", Doll, et al., Elektrizitatswirtschaft, Jg. 88 (1989), Heft 6. No Month.

*Primary Examiner*—Peter S. Wong
*Assistant Examiner*—Bao Q. Vu
*Attorney, Agent, or Firm*—Burns, Doane, Swecker & Mathis, L.L.P.

[57] ABSTRACT

In the case of a three-phase transformer which, per phase (U, V, W), has a primary-side winding ($U_{PW}$, $V_{PW}$, $W_{PW}$) and a secondary-side winding ($U_{SW}$, $V_{SW}$, $W_{SW}$), in-phase regulating windings ($U_L$, $V_L$, $W_L$) are provided on each limb per phase (U, V, W). These in-phase regulating windings ($U_L$, $V_L$, $W_L$) serve, by means of a tap switch 3 and a load switch 6, for in-phase regulation for the purpose of reactive volt-amperes distribution in electrical power supply networks. In addition, the in-phase regulating windings ($U_L$, $V_L$, $W_L$) are operatively connected via a further load switch 5 and a further tap switch 4 to a booster transformer (2). The voltages across primary windings $U_B$, $V_B$, $W_B$ of the booster transformer 2 effect quadrature or phase-angle regulation of the phase voltages $U_P$, $V_P$, $W_P$ in the three-phase transformer 1.

3 Claims, 2 Drawing Sheets

THREE-PHASE TRANSFORMER WITH IN PHASE REGULATING WINDING FOR THE REGULATION OF PHASE VOLTAGES

BACKGROUND OF THE INVENTION

1. Field of the Invention

The present invention is concerned with electrical power conversion by means of three-phase transformers in electrical networks. It relates to a three-phase transformer of the kind described in the preamble of the first claim.

2. Discussion of Background

In mesh-connected electrical power supply networks or ring networks, on many occasions it is necessary to change the current distribution in the network in order to protect a path against overloading or in order to achieve maximum efficiency in the overall current distribution, in other words minimum network losses. This becomes possible by inserting a voltage into the ring network, which voltage effects circulating currents. The result of superposition of said circulating currents on the previous network currents is a changed current distribution in the network and hence also in the transformers which are installed in the network and are operated in parallel.

Adding an additional voltage $U_Z$ in a network path can influence both the active volt-amperes distribution and the reactive volt-amperes distribution in a desirable manner within the network. For this purpose, the additional voltage $U_Z$ has a so-called in-phase component, which is in phase with the power supply voltage, and a quadrature component, which is phase-shifted by 90° with respect to the power supply voltage. A change in the in-phase component influences the reactive volt-amperes distribution in the network and the variation of the quadrature component controls the active volt-amperes flow. A combination of in-phase and quadrature regulation is called phase-angle regulation. The so-called phase-angle regulation consequently influences both the reactive volt-amperes distribution and the active volt-amperes distribution in the network.

In three-phase power supply networks, an additional voltage $U_Z$ acting according to the above principle is usually realized by means of three-phase autotransformers, as is described for example in "Elektrische Maschinen" [Electric Machines] by Bodefeld/Sequenz, Springer Verlag 1971, on pages 86 ff. A normal star-type autotransformer having various voltage taps is used to control the in-phase component, and is called in-phase regulating transformer in the text below. The control of the quadrature component is mainly performed by a delta-type autotransformer (likewise designed as a series transformer), a so-called quadrature regulating transformer. Accordingly, for combined in-phase and quadrature regulation in a network path, a main transformer is connected in series with an in-phase regulating transformer and a quadrature regulating transformer. The main transformer serves for the coupling of the high-voltage network and low-voltage network, and the series-connected in-phase and quadrature regulating transformers permit, by regulation, lower-loss and hence more economical utilization of transformers connected in parallel. However, the series circuit described has the disadvantage of the high production costs for the additional regulating transformers and their extensive space requirement. Furthermore, in-phase and quadrature regulating transformers are likewise lossy and exhibit, specifically, copper and core losses.

SUMMARY OF THE INVENTION

Accordingly, one object of the invention is to provide a novel further development of a three-phase transformer of the type mentioned in the introduction, to the effect that said transformer enables simpler and more cost-effective in-phase and quadrature regulation for the purpose of suitable load distribution in an electrical network, the space required for the in-phase and quadrature regulation being reduced, and the intention being to achieve a reduction in the network power loss in comparison with the prior art.

This object is achieved according to the invention by means of the features of the first claim.

The essence of the invention may be seen in the fact that within a three-phase transformer housing, both the required power transfer between two DC-decoupled networks is performed and desirable in-phase and quadrature or phase-angle regulation for reactive and active volt-amperes distribution in a power supply network is performed. For this purpose, an in-phase voltage which is adjustable in steps and a respective quadrature or phase-angle voltage of the two neighboring phases, which voltage is adjustable in steps, are added to a primary-side or a secondary-side phase voltage.

The advantages of the invention may be regarded, inter alia, in the fact that the in-phase and quadrature regulating transformers which are otherwise connected separately in series with a main transformer for the purpose of regulable reactive and active volt-amperes distribution are reduced merely to a few additional windings in the main transformer, plus a booster transformer on a separate active part with load switches. Both structural costs and operating costs are reduced by this measure. At this point, the structural cost savings encompass the cost-intensive transformer cores of conventional in-phase and quadrature regulating transformers, the winding copper and the necessary control area of the additional transformers. Operating cost savings can be quoted above all as a result of the lower core and copper losses.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Only the elements which are essential to understanding the invention are shown.

DESCRIPTION OF THE PREFERRED EMBODIMENTS

Figure 1:
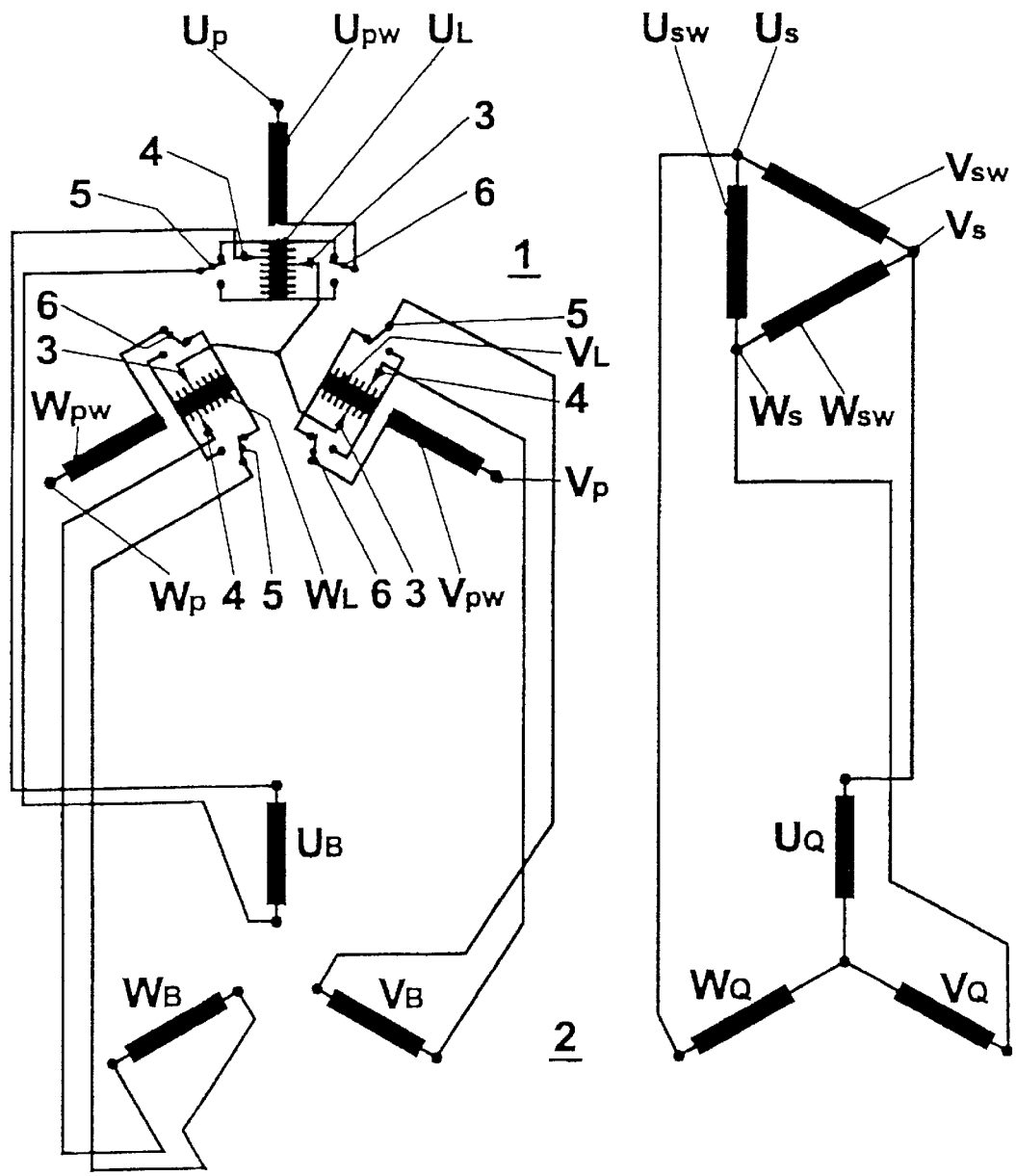
FIG. 1 diagrammatically shows a first embodiment of the invention using a three-phase transformer with in-phase and quadrature regulating windings.

Referring now to the drawings, wherein like reference numerals designate identical or corresponding parts throughout the several views, in FIG. 1, a three-phase transformer for transferring power between electrical networks is designated by 1, and a booster transformer which is operatively connected to the three-phase transformer is designated by 2. The three-phase transformer has three primary windings $U_{PW}$, $V_{PW}$ and $W_{PW}$ with the three phase voltages $U_P$, $V_P$ and $W_P$ and, furthermore, the three-phase transformer has three secondary windings $U_{SW}$, $V_{SW}$ and $W_{SW}$ with the three phase voltages $U_S$, $V_S$ and $W_S$. Moreover, a respective in-phase regulating winding $U_L$, $V_L$ and $W_L$ are arranged per phase U, V, W on each of the iron core limbs (not illustrated here).

The booster transformer 2 likewise has primary-side windings $U_B$, $V_B$, $W_B$, and also secondary-side windings $U_Q$, $V_Q$, $W_Q$, which in this case function as quadrature windings. The windings of the booster transformer 2 are arranged on a separate iron frame in the housing of the three-phase transformer 1. The primary-side windings $U_B$, $V_B$, $W_B$, of the booster transformer 2 are connected via a tap switch 4 and a load switch 5 in each case to the in-phase regulating windings $U_L$, $V_L$, $W_L$ of the three-phase transformer 1 of the same phase. The secondary-side windings $U_Q$, $V_Q$, $W_Q$ of the booster transformer 2 are electrically connected to the secondary windings $U_{SW}$, $V_{SW}$, $W_{SW}$ of the three-phase transformer 1. Except for the secondary windings $U_{SW}$, $V_{SW}$, $W_{SW}$, all the further windings of the three-phase transformer 1 and of the booster transformer 2 are wired up in a star connection. The secondary windings $U_{SW}$, $V_{SW}$, $W_{SW}$ of the three-phase transformer 1 are wired up as a delta connection.

As already explained, in-phase and quadrature regulating transformers known from the prior art serve for targeted reactive and active volt-amperes distribution in a power distribution network. According to the invention, this reactive and active volt-amperes distribution is achieved by suitable electrical connections of the in-phase regulating windings $U_L$, $V_L$ and $W_L$ and of the quadrature regulating windings $U_Q$, $V_Q$, $W_Q$ by means of booster transformer 2 to the primary and secondary windings $U_{PW}$, $V_{PW}$, $W_{PW}$, $U_{SW}$, $V_{SW}$ and $W_{SW}$. The requisite regulating methods for reactive and active volt-amperes distribution are sufficiently known in connection with the use of conventional in-phase and quadrature regulating transformers, so these regulating methods will not be explained in any detail per se in the text below. The invention relates, as a matter of priority, to an electrical circuit to which conventional regulating methods can be applied.

As is shown in FIG. 1, the primary winding $U_{PW}$ of the phase U is connected via a tap switch 3 and a load switch 6 to an in-phase regulating winding UL which lies in the same phase and comprises a number of partial windings. The two primary windings $V_{PW}$ and $W_{PW}$ of the neighboring phases V and W are electrically connected via the tap switch 3 and the load switch to the in-phase regulating windings $V_L$ and $W_L$, in a manner corresponding to the installation in phase U. Consequently, the installed tap switch 3 is equipped in all three phases U, V, W with corresponding tap contacts for driving the respective partial windings of the in-phase regulating windings $U_L$, $V_L$ and $W_L$ which permit the corresponding phase voltages $U_P$, $V_P$ and $W_P$ to be varied in steps within limits. In this case, all the phases are varied simultaneously by just one tap switch 3 by the same magnitude m in p.u. (per unit) by means of regulation. The voltage component of the in-phase regulating windings $U_L$ which is added to the phase voltage $U_P$ with the magnitude $m^*U_P$ may be positive or negative, depending on the selected switch position of the tap switch 3 and of the load switch 6, so that the resulting phase voltage is increased or decreased. With the regulating correction of the in-phase regulating windings, the resulting primary voltages amount to $U_P+m^*U_P$, $V_P+m^*V_P$ and $W_P+m^*W_P$.

A regulated change in the position of the tap switch 3 and the load switch 6 is used to reduce the reactive current exchange and the losses associated therewith in a power distribution network having a plurality of three-phase transformers operated in parallel.

In addition, as already explained in the introduction, the in-phase regulating windings $U_L$, $V_L$ and $W_L$ are connected via a load switch 5 and a tap switch 4 to the booster windings $U_B$, $V_B$ and $W_B$. The voltages which are thereby added between the load switch 5 and a tap switch 4 to the in-phase regulating windings $U_L$, $V_L$ and $W_L$ have a phase shift of 90° leading or lagging relative to their associated phase voltages $U_P$, $V_P$, $W_P$ with which they are linked. The magnitude of the voltages added is determined by the tap switch 4, and their sign by the position of the load switch 5. The 90° phase-shifted additional voltages are generated by the quadrature voltages $U_Q$, $V_Q$ and $W_Q$ in the booster transformer 2. The wiring up of the secondary windings $U_{SW}$, $V_{SW}$, $W_{SW}$ arranged in a delta connection in the three-phase transformer 1 with the windings $U_Q$, $V_Q$ and $W_Q$ arranged in a star connection in the booster transformer 2 generates the desired 90° phase shift of the additional voltage at the load switch 5 and tap switch 4. The addition of the 90° phase-shifted additional voltages to the primary windings $U_P$, $V_P$, $W_P$ corrects the same to the effect that their new phase shift effects a preferred active volt-amperes distribution in an electrical network and, moreover, enables the losses to be reduced. The voltage component of the quadrature regulating windings $U_Q$, $V_Q$, $W_Q$ which is added to the phase voltages $U_P$, $V_P$, $W_P$ has a magnitude of n p.u. (per unit) and is varied in accordance with a regulating specification. The additional voltages consequently turn out to be $n^*U_B, n^*V_B, n^*W_B$; they may be positive or negative, depending on the selected switch position of the tap switch 4 and the load switch 5, so that the resulting phase angle is increased or decreased. With the regulating correction of the quadrature regulating windings $U_Q$, $V_Q$, $W_Q$, the resulting primary voltages amount to $U_P+n^*U_B$, $V_P+n^*V_B$ and $W_P+n^*W_B$.

As described, therefore, the inventive in-phase and quadrature regulation for reactive and active volt-amperes distribution in electrical networks is performed directly on only one regulating winding $U_L$, $V_L$, $W_L$ connected to tap switches 3, 4 and load switches 5, 6. What may be emphasized as being particularly advantageous here is the fact that the regulating windings $U_L$, $V_L$, $W_L$ on which the switching operations are carried out in accordance with the regulation are kept at low potential by installing this regulating winding on the star point side.

Figure 2:
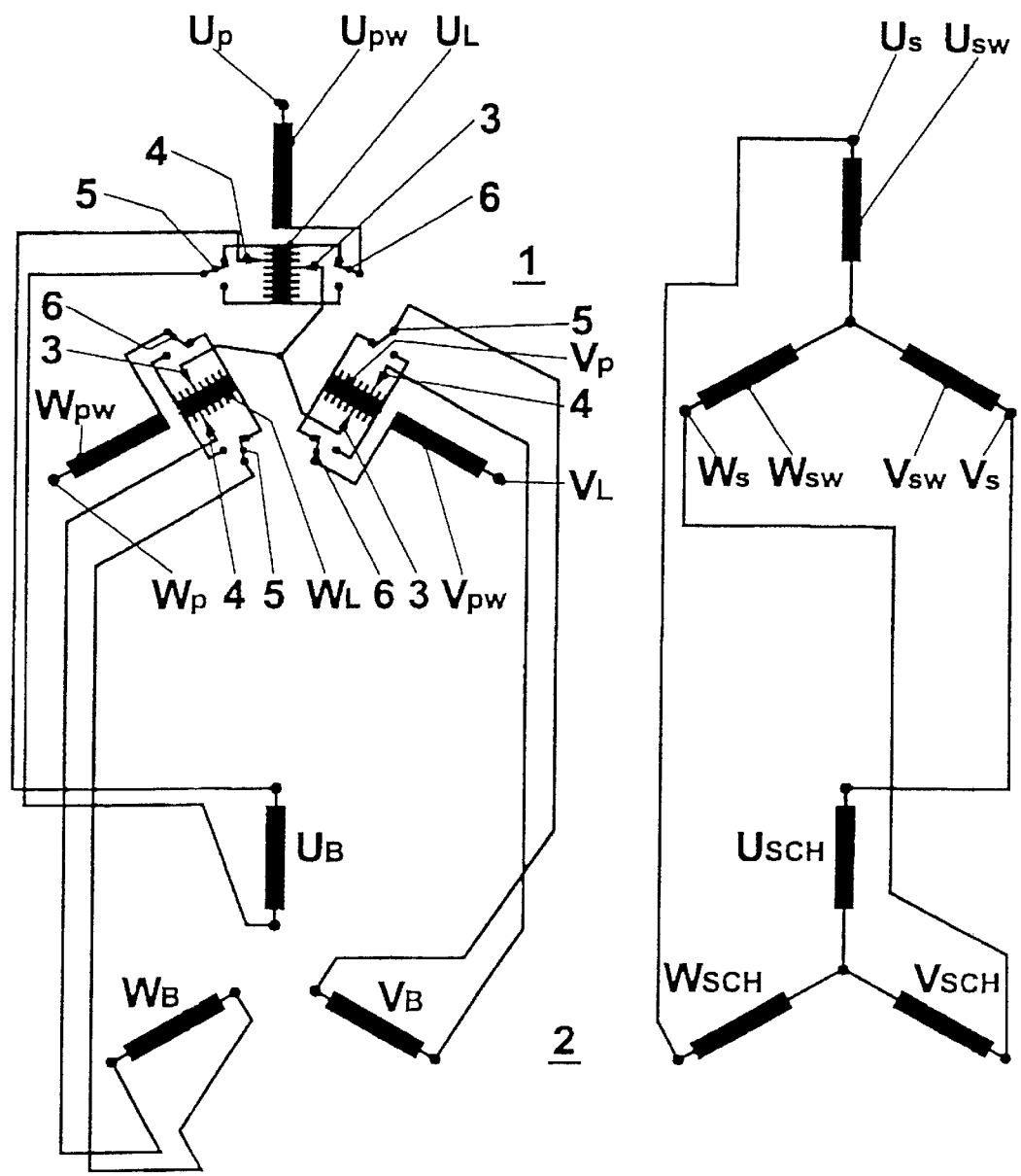
FIG. 2 shows an alternative embodiment of the three-phase transformer.

An alternative embodiment variant of the invention is shown by FIG. 2. The difference from the first solution consists in the fact that the secondary windings $U_{SW}$, $V_{SW}$, $W_{SW}$ of the three-phase transformer 1 are arranged in a star connection. Consequently, the electrical coupling of the secondary windings $U_{SW}$, $V_{SW}$, $W_{SW}$ to the booster transformer 2 at the secondary windings thereof produces so-called phase-angle voltages on phase-angle regulating windings $U_{Sch}$, $V_{Sch}$, $W_{Sch}$. These phase-angle voltages have, after transformation in the booster transformer 2, at the load switches 5 and the tap switches 4, an additional voltage out of phase with respect to the corresponding phase voltages $U_P$, $V_P$, $W_P$ and having a phase shift not equal to 90°.

In the sense of the invention, it is also conceivable to install inventive quadrature and in-phase regulation exclusively on the secondary side of the three-phase transformer 1, it being possible, moreover, for the circuitry of all the windings in the three-phase transformer and in the booster transformer to differ from the transformer shown.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A three-phase transformer which has, for each phase (U, V, W), at least one primary-side winding ($U_{PW}$, $V_{PW}$, $W_{PW}$) and at least one secondary-side winding ($U_{SW}$, $V_{SW}$, $W_{SW}$), which are installed on a limb of an iron core, the three-phase transformer, for use in an electrical power transmission network, being provided with in-phase and/or quadrature regulation and/or phase-angle regulation for the purpose of obtaining a suitable reactive and/or active volt-amperes distribution, wherein on each limb for each phase (U, V, W) at least one in-phase regulating winding ($U_L$, $V_L$, $W_L$) is operatively connected to the primary-side winding ($U_{PW}$, $V_{PW}$, $W_{PW}$) and/or the secondary-side winding ($U_{SW}$, $V_{SW}$, $W_{SW}$), the in-phase regulating winding ($U_L$, $V_L$, $W_L$) is connected to a first tap switch (3) and a first load switch (6) for in-phase regulation of the primary-side phase voltage ($U_P$, $V_P$, $W_P$) and/or secondary-side phase voltages ($U_S$, $V_S$, $W_S$), and the in-phase regulating winding ($U_L$, $V_L$, $W_L$) is operatively connected via a second tap switch (4) and a second load switch (5) to a three-phase booster transformer (2), arranged on a separate active part, for the purpose of quadrature regulation or phase-angle regulation.

2. The three-phase transformer as claimed in claim 1, wherein the in-phase regulating winding ($U_L$, $V_L$, $W_L$) is electrically connected via the second tap switch (4) and a second load switch (5) to a booster winding ($U_B$, $V_B$, $W_B$).

3. The three-phase transformer as claimed in claim 2, wherein the primary-side winding ($U_{PW}$, $V_{PW}$, $W_{PW}$) or the secondary-side winding ($U_{SW}$, $V_{SW}$, $W_{SW}$) is directly electrically operatively connected to a quadrature regulating winding ($U_Q$, $V_Q$, $W_Q$) or phase-angle regulating winding ($U_{Sch}$, $V_{Sch}$, $W_{Sch}$) of the booster transformer (2).

* * * * *